(12) United States Patent
Zhou

(10) Patent No.: US 10,493,742 B2
(45) Date of Patent: Dec. 3, 2019

(54) ULTRA-THIN GLASS ATTACHMENT STRUCTURE AND A STRIPPING METHOD AND ATTACHING PROCESS THEREOF, AND A MANUFACTURING METHOD OF A DISPLAY DEVICE

(71) Applicant: BOE TECHNOLOGY GROUP CO., LTD., Beijing (CN)

(72) Inventor: Xiaodong Zhou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/905,259

(22) PCT Filed: Aug. 17, 2015

(86) PCT No.: PCT/CN2015/087207
§ 371 (c)(1),
(2) Date: Jan. 14, 2016

(87) PCT Pub. No.: WO2016/155198
PCT Pub. Date: Oct. 6, 2016

(65) Prior Publication Data
US 2017/0106643 A1    Apr. 20, 2017

(30) Foreign Application Priority Data
Mar. 30, 2015   (CN) .......................... 2015 1 0144150

(51) Int. Cl.
*B32B 43/00* (2006.01)
*B32B 38/10* (2006.01)
(Continued)

(52) U.S. Cl.
CPC .......... *B32B 38/10* (2013.01); *B32B 37/0076* (2013.01); *B32B 37/1292* (2013.01);
(Continued)

(58) Field of Classification Search
CPC ... G06F 3/016; H01L 41/0825; G01L 1/2287; G01L 1/2206; B32B 38/10;
(Continued)

(56) References Cited

U.S. PATENT DOCUMENTS

2004/0000370 A1   1/2004   Kiuchi et al.
2011/0141052 A1*  6/2011   Bernstein ............... G06F 3/016
                                                              345/174
(Continued)

FOREIGN PATENT DOCUMENTS

CN   1469914 A      1/2004
CN   101827907     9/2010
(Continued)

OTHER PUBLICATIONS

English translation of CN104465475A, published Mar. 25, 2015.*
(Continued)

*Primary Examiner* — Mark A Osele
*Assistant Examiner* — Nickolas R Harm
(74) *Attorney, Agent, or Firm* — Womble Bond Dickinson (US) LLP

(57) ABSTRACT

The present application discloses an ultra-thin glass attachment structure and a stripping method thereof, and a manufacturing method of a display device. The ultra-thin glass attachment structure comprises: an ultra-thin glass layer, a bonding layer and a carrier substrate which are attached and provided sequentially; the bonding layer comprises a plurality of first stretchable structures tiled, and every two of first stretchable structures are all provided separately; the stripping method comprises: driving the first stretchable structures in the bonding layer expand; stripping the ultra-thin glass layer; the manufacturing method of a display device comprises the above stripping method. Embodiments of the present application largely reduces the bonding area between the ultra-thin glass layer and a carrier substrate, reduces the suction force between the two, reduces the difficulty of stripping the ultra-thin glass layer from the carrier, avoids damage to the ultra-thin glass, improves product yield.

13 Claims, 3 Drawing Sheets

(51) Int. Cl.
*G02F 1/13* (2006.01)
*B32B 37/00* (2006.01)
*B32B 37/12* (2006.01)
*G01L 1/22* (2006.01)
*G06F 3/01* (2006.01)
*G02F 1/1333* (2006.01)

(52) U.S. Cl.
CPC .......... *G02F 1/1303* (2013.01); *B32B 43/006* (2013.01); *B32B 2457/202* (2013.01); *G01L 1/2206* (2013.01); *G01L 1/2287* (2013.01); *G02F 2001/133302* (2013.01); *G02F 2202/28* (2013.01); *G06F 3/016* (2013.01); *Y10T 156/1092* (2015.01)

(58) Field of Classification Search
CPC ....... B32B 43/006; G02F 1/13; G02F 1/1303; Y10T 156/1092; Y10T 156/1142
USPC ........ 438/27, 438; 349/12; 428/156; 156/83, 156/247, 288, 299, 709
See application file for complete search history.

(56) References Cited

U.S. PATENT DOCUMENTS

| | | | | |
|---|---|---|---|---|
| 2011/0149410 A1* | 6/2011 | Blum | ....................... | G02B 3/14 359/666 |
| 2013/0051587 A1* | 2/2013 | Stephanou | ............. | G01H 11/08 381/190 |
| 2013/0082970 A1* | 4/2013 | Frey | ...................... | G06F 3/0414 345/173 |
| 2014/0113828 A1* | 4/2014 | Gilbert | ................. | H01L 39/126 505/100 |
| 2014/0140551 A1* | 5/2014 | Ramstein | ............. | H04R 17/005 381/182 |
| 2015/0030217 A1* | 1/2015 | Wickboldt | ......... | G06K 9/00026 382/124 |
| 2015/0054756 A1* | 2/2015 | Ikeda | ...................... | G06F 3/016 345/173 |

FOREIGN PATENT DOCUMENTS

| | | |
|---|---|---|
| CN | 102834943 | 12/2012 |
| CN | 103144071 | 6/2013 |
| CN | 104465475 | 3/2015 |
| CN | 104698631 | 6/2015 |
| JP | 2004115766 A | 4/2004 |
| KR | 20140006306 | 1/2014 |

OTHER PUBLICATIONS

Drawings of CN104465475A.*
Office Action in Chinese Application No. 201510144150.4 dated Aug. 28, 2017, with English translation.
Office Action in Chinese Application No. 201510144150.4 dated Feb. 17, 2017, with translation. 9 pages.
International Search Report and Written Opinion with English Language Translation, dated Oct. 30, 2015, Application No. PCT/CN2015/087207.

* cited by examiner

ULTRA-THIN GLASS ATTACHMENT STRUCTURE AND A STRIPPING METHOD AND ATTACHING PROCESS THEREOF, AND A MANUFACTURING METHOD OF A DISPLAY DEVICE

TECHNICAL FIELD

The application refers to a technical field of display manufacturing, and specifically to an ultra-thin glass attachment structure and a stripping method and attaching process thereof, and a manufacturing method of a display device.

BACKGROUND

Thinning is an important direction of development of the liquid crystal display, which needs to make the glass layer used for manufacturing the liquid crystal display as thin as possible.

Currently, when manufacturing a liquid crystal display, the glass layer employed is an ultra-thin glass. Since the ultra-thin glass is too thin and too flexible, when manufacturing a liquid crystal display, the ultra-thin glass should be attached on the carrier, and the attachment surfaces of the ultra-thin glass and the carrier should be leveled and then attached tightly entirely, and after finishing the liquid crystal display, the ultra-thin glass is stripped from the carrier.

In the course of implementing this application, the inventor found there is at least the following problem in prior art:

After entirely attaching the attachment surfaces of the ultra-thin glass and the carrier tightly, there is a relatively strong suction force between the two, making it harder to strip the ultra-thin glass from the carrier, and very easy to damage the ultra-thin glass, and resulting in low product yield.

SUMMARY

For addressing the problem of hardly stripping the ultra-thin glass from the carrier in the prior art, the application provides an ultra-thin glass attachment structure and a stripping method thereof, a display device. The specific technical solutions are as follows:

In a first aspect, an ultra-thin glass attachment structure is provided, which comprises: an ultra-thin glass layer, a bonding layer and a carrier substrate which are attached and arranged sequentially;

the bonding layer comprises a plurality of first elastically stretchable structures tiled, and every two of first elastically stretchable structures are all provided separately to each other.

Further, the bonding layer further comprises a plurality of second elastically stretchable structures tiled, and the plurality of first elastically stretchable structures and the plurality of second elastically stretchable structures are arranged interlacedly with each other respectively.

As a preferred embodiment, the plurality of first elastically stretchable structures and the plurality of second elastically stretchable structures are arranged interlacedly as a checkerboard-like shape.

As a preferred embodiment, the elastically stretchable structures all comprise an electrostrictive material layer and two electrode layers which are provided on the upside and downside surfaces of the electrostrictive material layer respectively.

As a preferred embodiment, the electrostrictive material layer is a polyurethane layer having a thickness of 100-200 micrometer.

As a preferred embodiment, the thickness of the ultra-thin glass layer is 0.05-0.2 mm.

Further, the ultra-thin glass attachment structure further comprises glue layers, and the glue layers are attached and provided between the ultra-thin glass layer and the bonding layer and between the carrier substrate and the bonding layer.

As a preferred embodiment, the carrier substrate is a glass substrate, the thickness of which is larger than or equal to 0.5 mm.

In a second aspect, a stripping method for an ultra-thin glass attachment structure is provided, which comprises the steps of:

driving the first elastically stretchable structures in the bonding layer expand;

stripping the ultra-thin glass layer.

As a preferred embodiment, the stripping method comprises the steps of:

driving the first elastically stretchable structures in the bonding layer expand, which causes the portions of the ultra-thin glass layer at the second elastically stretchable structures separate from the bonding layer;

driving the first elastically stretchable structures contract and the second elastically stretchable structures expand, which causes the portions of the ultra-thin glass layer at the first elastically stretchable structures separate from the bonding layer; and stripping the ultra-thin glass layer.

As a preferred embodiment, the step of driving the first elastically stretchable structures in the bonding layer expand, which causes the portions of the ultra-thin glass layer at the second elastically stretchable structures separate from the bonding layer specifically comprises:

applying an electric field to the first elastically stretchable structures, which causes the first stretchable structures expand and squeeze the ultra-thin glass layer and then causes the portions of the ultra-thin glass layer at the second elastically stretchable structures separate from the bonding layer.

As a preferred embodiment, the step of driving the first elastically stretchable structures contract and the second elastically stretchable structures expand, which causes the portions of the ultra-thin glass layer at the first elastically stretchable structures separate from the bonding layer specifically comprises:

removing the electric field at the first elastically stretchable structures, which causes the first elastically stretchable structures contract;

applying an electric field to the second elastically stretchable structures, which causes the second stretchable structures expand and squeeze the ultra-thin glass layer and then causes the portions of the ultra-thin glass layer at the first elastically stretchable structures separate from the bonding layer.

In a third aspect, a manufacturing method for a display device is provided, which comprises the stripping method for an ultra-thin glass attachment structure as described above.

In a fourth aspect, a attaching process for manufacturing an ultra-thin glass attachment structure is provided, which comprises: preparing a carrier substrate; forming an electrode layer on the carrier substrate; making an electrostrictive material layer on the surface of the electrode layer; further making an electrode layer on the surface of the electrostrictive material layer; surface treating the surface of the electrode layer made later, in order to facilitate attaching the ultra-thin glass layer; surface treating the surface of the ultra-thin glass layer; and attaching the ultra-thin glass layer on the surface of the electrode layer made later.

The embodiments of the application provide the following advantageous effects:

The ultra-thin glass attachment structure and the stripping method thereof and the display device cause more gaps exist between the attachment surfaces of the ultra-thin glass layer and the carrier substrate, by separately providing every two of the first elastically stretchable structures in the bonding layer (that is, there is a gap between every two of the first elastically stretchable structures), which largely reduces the bonding area between the ultra-thin glass layer and the carrier substrate, reduces the suction force between the two, reduces the difficulty of stripping the ultra-thin glass layer from the carrier, avoids damage to the ultra-thin glass, improves product yield.

BRIEF DESCRIPTION OF FIGURES

For more clearly illustrate the technical solutions of the embodiments of the application, the figures needed for used in the description of the embodiments will be introduced simply below. Apparently, the figures in the following description are only some embodiments of the application. For those ordinary skilled in the art, other figures can be obtained also from these figures without expending creative effort. It should be apparent that, the embodiments illustrated below are only for explaining the application, and do not constitute limitation to the scope of the application. It also should be apparent that, the figures are not drawn to scale, and rather some components may be exaggerated to highlight the creation of the application.

LIST OF REFERENCE SIGNS

1: ultra-thin glass layer; 2: bonding layer; 21: first elastically stretchable structure; 22: second elastically stretchable structure;
3: carrier substrate;
4: electrode layer;
5: glue layer.

DETAIL EMBODIMENTS

The implementation of the application will be described in more detail in conjunction with the figures, for making the object, technical solution and advantage of the application more clear.

Figure 1:
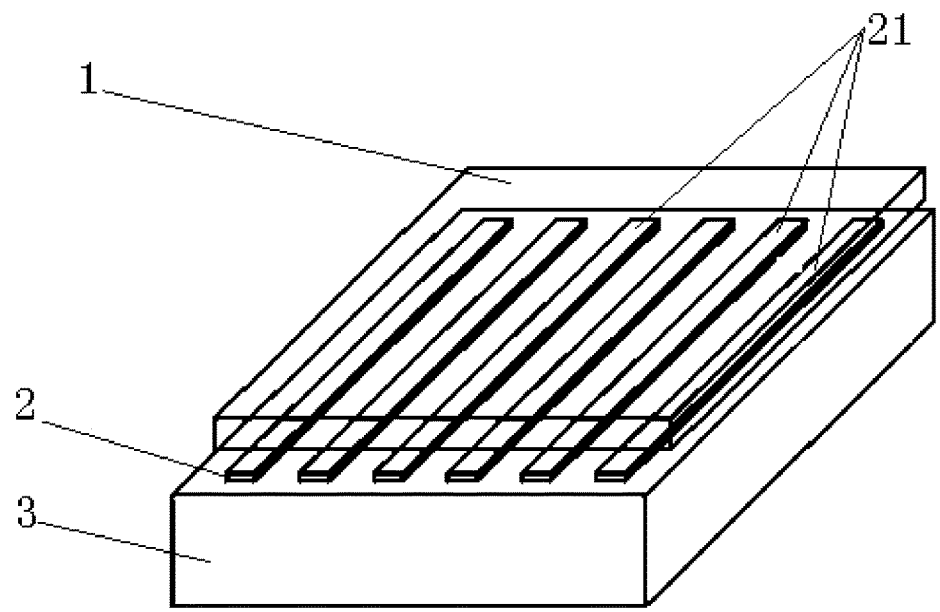
FIG. 1 is a schematic view of an ultra-thin glass attachment structure provided by an embodiment of the application.

As shown in FIG. 1, the embodiment of the application provides an ultra-thin glass attachment structure, which comprises: an ultra-thin glass layer 1, a bonding layer 2 and a carrier substrate 3 which are attached and arranged sequentially;

the bonding layer 2 comprises a plurality of first elastically stretchable structures 21 tiled, and every two of first elastically stretchable structures 21 are all provided separately from each other.

In the embodiment of the application, the attaching between the ultra-thin glass layer 1 and the carrier substrate 3 is realized by means of the bonding layer 2. Therein, every two of the first elastically stretchable structures 21 in the bonding layer 2 are all provided separately, that is, there is a gap between every two of the first elastically stretchable structures 21, that is, the bonding layer 2 actually only includes a plurality of first elastically stretchable structures 21 separately provided between the ultra-thin glass layer 1 and the carrier substrate 3 (the first elastically stretchable structures 21 may have a strip shape, or a circle shape or rectangular shape, etc.), thereby compared to an integral bonding layer 2, the surface area of the bonding layer 2 of the embodiment of the application is reduced largely, so as to make the attachment surfaces of the ultra-thin glass layer 1 and the carrier substrate 3 not completely and integrally attach together, but present relatively more gaps, reducing the attaching area between the ultra-thin glass layer 1 and the carrier substrate 3, reducing the suction force between the two, reducing the difficulty of stripping the ultra-thin glass from the carrier. Therefore, when stripping the ultra-thin glass, it can be stripped only by applying a relatively small force, avoiding damage to the ultra-thin glass, improving the product yield.

Besides, the expanding and contracting functions of the first elastically stretchable structure 21 can change the gaps between the ultra-thin glass layer 1 and the carrier substrate 3, which assists reducing the attaching strength between the ultra-thin glass layer 1 and the carrier substrate 3, makes stripping the ultra-thin glass layer 1 from the carrier substrate 3 more easy.

Figure 2:
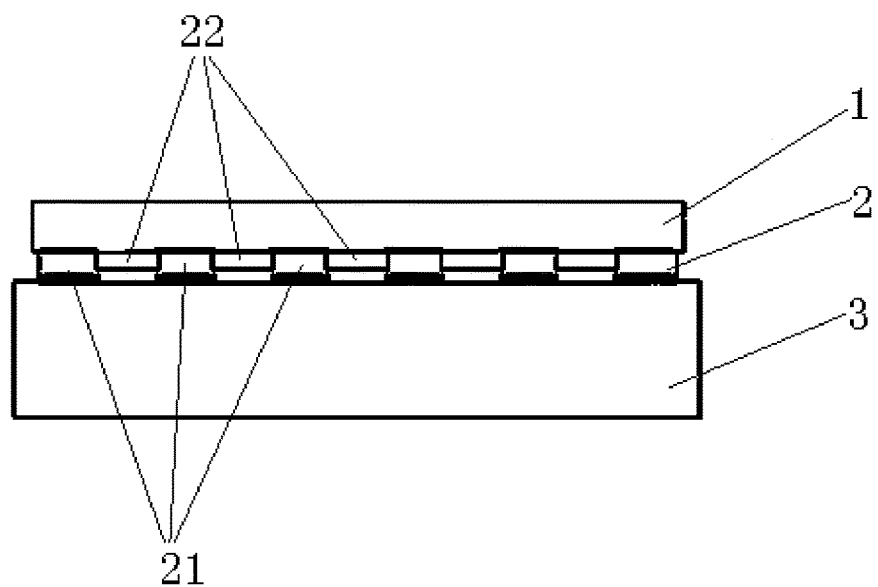
FIG. 2 is a schematic view of an ultra-thin glass attachment structure provided by another embodiment of the application.

As shown in FIG. 2, further, the bonding layer 2 further comprises a plurality of second elastically stretchable structures 22 tiled, and the plurality of first elastically stretchable structures 21 and the plurality of second elastically stretchable structures 22 are arranged interlacedly with each other respectively.

Therein, in the embodiment of the application, a second elastically stretchable structure 22 is interposed between every two of the first elastically stretchable structures 21, such that the first elastically stretchable structures 21 and the second elastically stretchable structures 22 are arranged interlacedly with each other, and the first elastically stretchable structures 21 and the second elastically stretchable structures 21 are pieced together to form an integral bonding layer 2, realizing the attaching between the ultra-thin glass layer 1 and the carrier substrate 3. There are many kinds of implementations of the first elastically stretchable structures 21 and the second elastically stretchable structures 22, such as employing a material which expands under heat, a material which expands upon being powered, or a magnetostrictive material, etc.

When the ultra-thin glass layer 1 is needed to be stripped from the carrier substrate 3, firstly the first elastically stretchable structures 21 are driven expand, so as to jack up the ultra-thin glass layer 1 at the first elastically stretchable structures 21, and the second elastically stretchable structures 22 would not undergo deformation. At this time, the first elastically stretchable structures 21 can jack up the ultra-thin glass layer 1 above the second elastically stretchable structures 22, realizing the separation of the ultra-thin glass layer 1 and the bonding layer at that place.

Then the first elastically stretchable structures 21 are driven contract, and the second elastically stretchable structures 22 are driven expand. For the same reason, the second elastically stretchable structures can jack up the ultra-thin glass layer 1 above the first elastically stretchable structures 21, causing the ultra-thin glass layer 1 at the area of the first elastically stretchable structures 21 separate from the bonding layer.

As such, by means of alternant expanding of the first elastically stretchable structures 21 and the second elastically stretchable structures 22 arranged interlacedly, the ultra-thin glass layer 1 can completely separate from the bonding layer, making the ultra-thin glass layer 1 subjected even force, and the separation is extremely convenient, and the ultra-thin glass layer 1 is not easily damaged, thus being able to be stripped directly. This largely reduces the difficulty of stripping the ultra-thin glass layer 1 from the carrier substrate 3, prevents damage to the ultra-thin glass layer 1, improves the product yield; also, the carrier substrate 3 may be recycled, so as to save cost.

Figure 3:
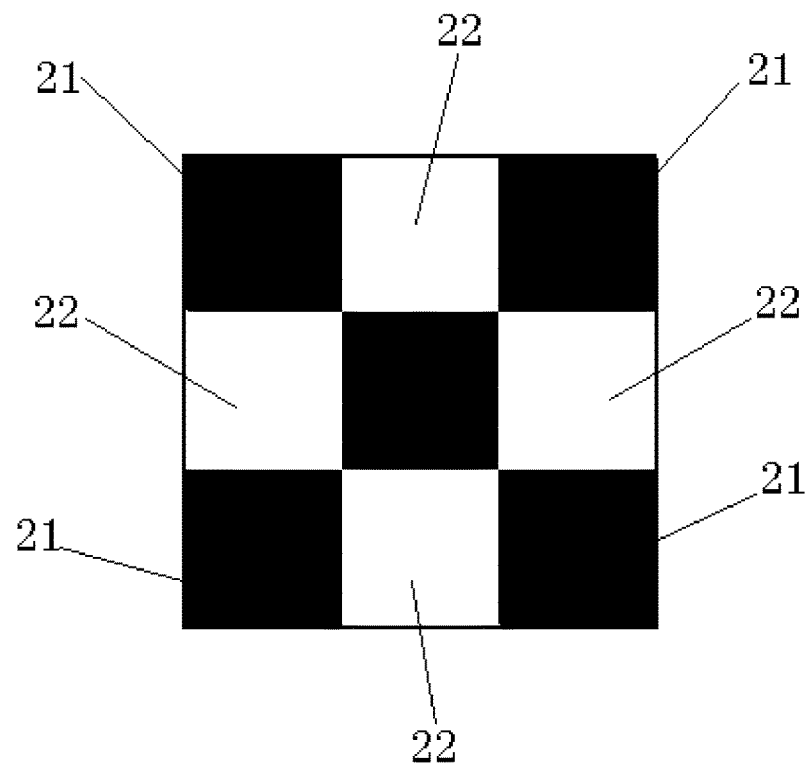
FIG. 3 is a schematic structure view of a bonding layer provided by another embodiment of the application.

As shown in FIG. 3, preferably, the plurality of first elastically stretchable structures 21 and the plurality of second elastically stretchable structures 22 are arranged interlacedly as a checkerboard-like shape. Certainly, there are many ways of arrangements for the first elastically stretchable structures 21 and the second elastically stretchable structures 22, such as having a checkerboard-like shape or a shape of separated strips, etc. The first elastically stretchable structures 21 and the second elastically stretchable structures 22 may cling to each other or be arranged separately, as long as the two are arranged interlacedly so as to facilitate alternately applying force to the ultra-thin glass layer 1 for the purpose of facilitating stripping it.

Figure 4:
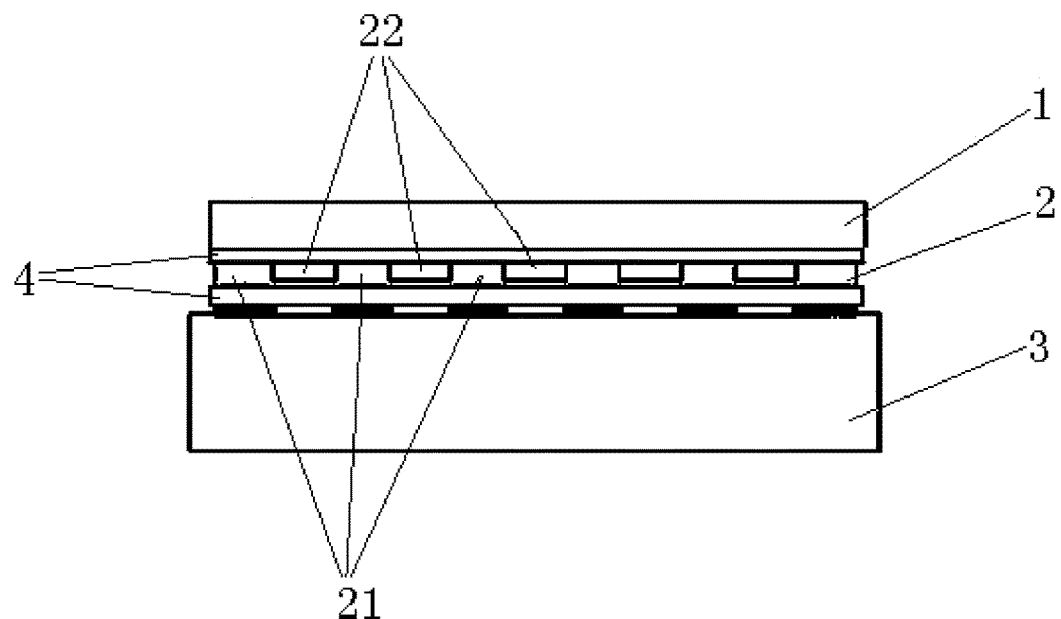
FIG. 4 is a schematic view of an ultra-thin glass attachment structure provided by another embodiment of the application.

As shown in FIG. 4, preferably, the first elastically stretchable structures 21 and the second elastically stretchable structures 22 of the bonding layer 2 all comprise an electrostritive material layer and two electrode layers 4 which are provided on the upside and downside surfaces of the electrostrictive material layer respectively.

In the embodiment of the application, the upside and downside surfaces of the electrostrictive material layer which is made of electrostrictive material are provided with an electrode layer 4 respectively. When powering the different areas of the first elastically stretchable structures 21 and the second elastically stretchable structures 22 in the bonding layer 2, the powering operation can be directly via the electrode layers 4, so as to realize powering the electrostrictive material layer to make it expand or contract.

Besides, as known by those skilled in the art, the first elastically stretchable structures 21 and the second elastically stretchable structures 22 may also employ other materials, such as a material which expands under heat, where the expanding or contracting of the first elastically stretchable structures 21 and the second elastically stretchable structures 22 is realized by the change of temperature.

In the embodiments of the application, when operating specifically: firstly, applying an electric field to the first elastically stretchable structures 21, to make the first elastically stretchable structures 21 expand and squeeze the ultra-thin glass layer 1, so as to cause the ultra-thin glass layer 1 at the areas of the second elastically stretchable structures 22 separate from the bonding layer 1;

removing the electric field at the first elastically stretchable structures 21, to make the first elastically stretchable structures 21 contract;

applying an electric field to the second elastically stretchable structures 22, to make the second elastically stretchable structures 22 expand and squeeze the ultra-thin glass layer 1 and then cause the ultra-thin glass layer 1 at the areas of the first elastically stretchable structures 21 separate from the bonding layer.

Preferably, the first elastically stretchable structures 21 and the second elastically stretchable structures 22 of the bonding layer 2 are all a layer of polyurethane having a thickness of 100-200 µm.

Therein, the bonding layer 2 employs a layer of polyurethane having a thickness of 100-200 µm, which is more easily produced, and facilitates being applied between the ultra-thin glass layer 1 and the carrier substrate 3.

Preferably, the thickness of the ultra-thin glass 1 is 0.05-0.2 mm.

A construction in which the first elastically stretchable structures 21 and the second elastically stretchable structures 22 which are interlaced is employed by the embodiment of the application, so that stripping an ultra-thin glass layer 1 with a minimum thickness of 0.05 mm can be realized, and the stripping is easy and would not damage the ultra-thin glass layer 1. Therefore, the actual usage advantage is obvious.

Figure 5:
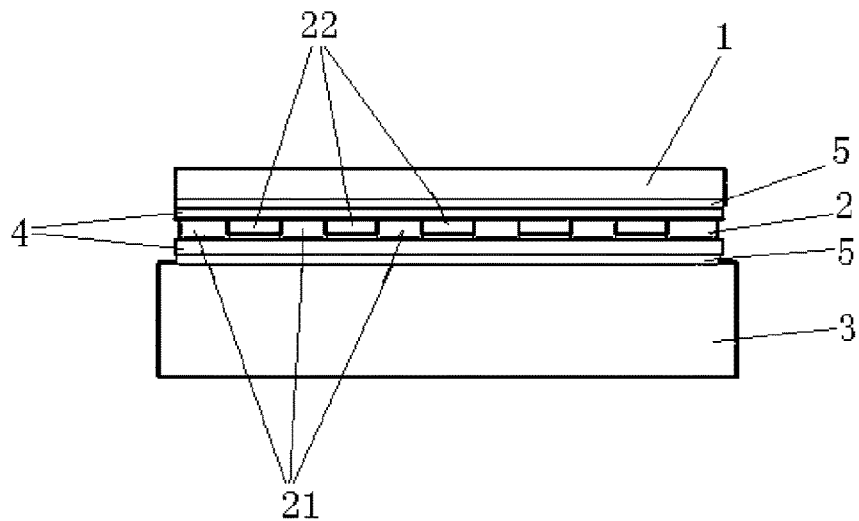
FIG. 5 is a schematic view of an ultra-thin glass attachment structure provided by another embodiment of the application.

As shown in FIG. 5, further, the ultra-thin glass attachment structure further comprises glue layers 5, and the glue layers 5 are attached and provided between the ultra-thin glass layer 1 and the bonding layer 2 and between the carrier substrate 3 and the bonding layer 2.

In the embodiment of the application, the specific structure is formed by attaching sequentially the ultra-thin glass layer 1, the first elastically stretchable structures 21 and the second elastically stretchable structures 22, the carrier substrate 3. By providing the glue layers 5 between the ultra-thin glass layer 1 and the adjacent electrode layer 4, and between the carrier substrate 3 and the adjacent electrode layer 4, the ultra-thin glass layer 1 and the carrier substrate 3 are connected more closely, and attached more tightly, which facilitates the operations of various processes during manufacturing the liquid crystal display, and prevents damage of the ultra-thin glass layer 1.

In the embodiment of the application, the attaching process of the ultra-thin glass layer attachment structure is specifically as follows:

Preparing a carrier substrate 3, and forming an electrode layer 4 on the carrier substrate 3; making an electrostrictive material layer on the surface of the electrode layer 4; further making an electrode layer 4 on the surface of the electrostrictive material layer; surface treating the surface of the electrode layer 4 (e.g. regular processing such as leveling processing or glue coating), in order to facilitate attaching the ultra-thin glass layer 1; surface treating the surface of the ultra-thin glass layer 1; and attaching the ultra-thin glass layer 1 on the surface of the electrode layer 4.

The above process steps are preferably performed in a vacuum.

Preferably, the carrier substrate 3 is a glass substrate, the thickness of which is larger than or equal to 0.5 mm.

There are many implementations for the carrier substrate 3. In the embodiment of the application, a glass substrate having a thickness larger than or equal to 0.5 mm is employed, the actual production cost of it is relatively low, and it is easily obtained, so it have an obvious advantage as a carrier substrate 3.

Figure 6:
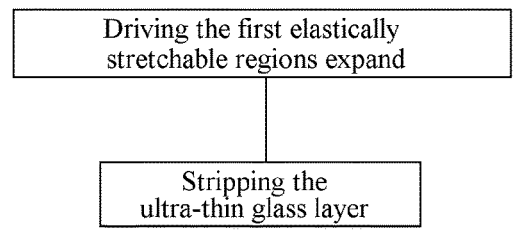
FIG. 6 is a schematic flowchart of a stripping method for an ultra-thin glass attachment structure provided by another embodiment of the application.

As shown in FIG. 6, a stripping method for an ultra-thin glass attachment structure is provided, which comprises the steps of: driving the first elastically stretchable structures 21 in the bonding layer 2 expand; stripping the ultra-thin glass layer 1.

In the embodiments of the application, the ultra-thin glass layer 1 and the carrier substrate 3 are attached via the bonding layer 2. Therein, every two of first elastically stretchable structures 21 in the bonding layer 2 are all provided separately, that is, there is a gap between every two of the first elastically stretchable structures 21, that is, the bonding layer 2 actually only includes a plurality of first elastically stretchable structures 21 separately provided between the ultra-thin glass layer 1 and the carrier substrate 3. Thereby compared to an integral bonding layer 2, the surface area of the bonding layer 2 of the embodiment of the application is reduced largely, so as to make the attachment surfaces of the ultra-thin glass layer 1 and the carrier substrate 3 not completely and integrally attach together, but present relatively more gaps, largely reducing the attaching area between the ultra-thin glass layer 1 and the carrier substrate 3, reducing the suction force between the two. When stripping, directly drives the first elastically stretchable structures 21 expand, and then strips the ultra-thin glass layer 1, so that largely reduces the difficulty of stripping the ultra-thin glass from the carrier, i.e. when stripping the ultra-thin glass, it can be stripped only by applying a relatively small force, avoiding damage to the ultra-thin glass and improving the product yield.

Besides, the expanding and contracting functions of the first elastically stretchable structure 21 can change the gaps between the ultra-thin glass layer 1 and the carrier substrate 3, which assists reducing the attaching strength between the ultra-thin glass layer 1 and the carrier substrate 3, makes it more ease to strip the ultra-thin glass layer 1 from the carrier substrate 3.

Figure 7:
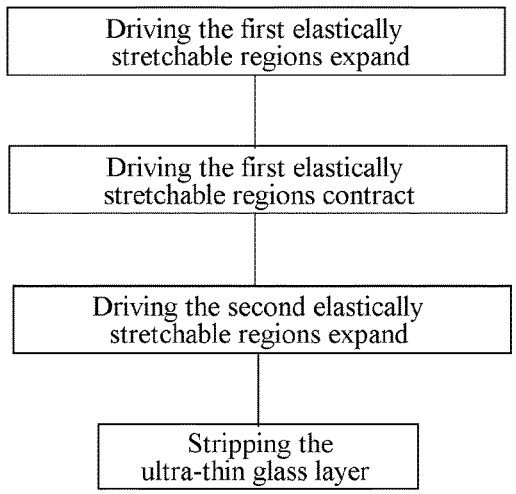
FIG. 7 is a schematic flowchart of a stripping method for an ultra-thin glass attachment structure provided by another embodiment of the application.

As shown in FIG. 7, preferably, the step of driving the first elastically stretchable structures 21 in the bonding layer 2 expand specifically comprises: driving the first elastically stretchable structures 21 in the bonding layer 2 expand, which causes the portions of the ultra-thin glass layer 1 at the second elastically stretchable structures 22 separate from the bonding layer.

Further, after driving the first elastically stretchable structures 21 in the bonding layer 2 expand, the following steps are further comprised:

Driving the first elastically stretchable structures 21 contract and the second elastically stretchable structures 22 expand, which causes the portions of the ultra-thin glass layer 1 at the first elastically stretchable structures 21 separate from the bonding layer.

In the embodiment of the application, a second elastically stretchable structure 22 is interposed between every two of the first elastically stretchable structures 21, such that the first elastically stretchable structures 21 and the second elastically stretchable structures 22 are arranged interlacedly with each other, thereby the first elastically stretchable structures 21 and the second elastically stretchable structures 21 are pieced together to form an integral bonding layer 2.

When the ultra-thin glass layer 1 is needed to be stripped from the carrier substrate 3, firstly the first elastically stretchable structures 21 are driven expand, so as to jack up the ultra-thin glass layer 1 at the first elastically stretchable structures 21, and the second elastically stretchable structures 22 would not undergo deformation. At this time, the first elastically stretchable structures 21 can jack up the ultra-thin glass layer 1 above the second elastically stretchable structures 22, realizing the separation of the ultra-thin glass layer 1 and the bonding layer at that place; then the first elastically stretchable structures 21 are driven contract, and the second elastically stretchable structures 22 are driven expand. For the same reason, the second elastically stretchable structures can jack up the ultra-thin glass layer 1 above the first elastically stretchable structures 21, causing the ultra-thin glass layer 1 at the areas of the first elastically stretchable structures 21 separate from the bonding layer.

As such, by means of the alternate expanding of the first elastically stretchable structures 21 and the second elastically stretchable structures 22 which are arranged interlacedly, the ultra-thin glass layer 1 can completely separate from the bonding layer, making the ultra-thin glass layer 1 subjected even force, and the separation is extremely convenient, and the ultra-thin glass layer 1 is not easily damaged, thus can be stripped directly. This largely reduces the difficulty of stripping the ultra-thin glass layer 1 from the carrier substrate 3, prevents damage to the ultra-thin glass layer 1, improves the product yield; also, the carrier substrate 3 may be recycled, so as to save cost.

Preferably, the step of driving the first elastically stretchable structures 21 in the bonding layer 2 expand, which causes the portions of the ultra-thin glass layer 1 at the second elastically stretchable structures 22 separate from the bonding layer specifically comprises:

applying an electric field to the first elastically stretchable structures 21, which causes the first elastically stretchable structures 21 expand and squeeze the ultra-thin glass layer 1 and then causes the portions of the ultra-thin glass layer 1 at the second elastically stretchable structures 22 separate from the bonding layer.

Preferably, the step of driving the first elastically stretchable structures 21 contract and the second elastically stretchable structures 22 expand, which causes the portions of the ultra-thin glass layer 1 at the first elastically stretchable structures 21 separate from the bonding layer specifically comprises:

removing the electric field at the first elastically stretchable structures 21, which causes the first elastically stretchable structures 21 contract;

applying an electric field to the second elastically stretchable structures 22, which causes the second stretchable structures 22 expand and squeeze the ultra-thin glass layer 1 and then causes the portions of the ultra-thin glass layer 1 at the first elastically stretchable structures 21 separate from the bonding layer.

Therein, in the embodiment of the application, the bonding layer 2 as a whole is made by an electrostrictive material layer and electrodes layers 4, so that its expanding or contracting can be realized by alternately powering the first elastically stretchable structures 21 and the second elastically stretchable structures 22, thus the operation is easy; the bonding layer 2 can also employ other materials, such as a material which expands under heat, wherein the expanding or contracting of the first elastically stretchable structures 21 and the second stretchable structures 22 can be realized by changing the temperature.

In the embodiment of the application, a manufacturing method for a display device is provided, which comprises the stripping method for an ultra-thin glass attachment structure as described above.

In the embodiment of the application, the ultra-thin glass layer 1 employed in the display device such as a liquid crystal display can made by the stripping method for the ultra-thin glass attachment structure as described in the above embodiments. Between the ultra-thin glass layer 1 and the carrier substrate 3, every two of the first elastically stretchable structures 21 in the bonding layer 2 are all provided separately. Compared to an integral bonding layer 2, the surface area of the bonding layer 2 of the embodiment of the application is reduced largely, so as to make the attachment surfaces of the ultra-thin glass layer 1 and the carrier substrate 3 not completely and integrally attach together, but present relatively more gaps, reducing the attachment area between the ultra-thin glass layer 1 and the carrier substrate 3, reducing the suction force between the two;

When stripping, directly drives the first elastically stretchable structures 21 expand, and then strips the ultra-thin glass layer 1, so that largely reduces the difficulty of stripping the ultra-thin glass from the carrier. When stripping the ultra-thin glass, it can be stripped only by applying a relatively small force, avoiding damage to the ultra-thin glass, improving the product yield; and, the expanding and contracting functions of the first elastically stretchable structures 21 can change the gaps between the ultra-thin glass layer 1 and the carrier substrate 3, which assists reducing the attaching strength between the ultra-thin glass layer 1 and the carrier substrate 3, makes it more ease to strip the ultra-thin glass layer 1 from the carrier substrate 3, realizes a thinner ultra-thin glass layer 1 than that in prior art being used in the display device, and prevents damage, and finally realizes thinning of the display device.

The above described are only preferred embodiments of the application, and does not been used for limiting the application. Any modifications, equivalent replacements, improvements, etc. within the spirit and principles of the application should be included in the protection scope of the application. It should be noted that, wording "include" does not exclude the presence of other elements or steps which are not listed in the claims. The wording "a" or "an" ahead of an element does not exclude the presence of a plurality of such elements. The mere fact that certain measures are recited in mutually different dependent claims does not indicate that a combination of these measures cannot be used to advantage. Any reference signs in the claims should not be construed to limit scopes.

The invention claimed is:

1. An ultra-thin glass attachment structure comprising an ultra-thin glass layer, a bonding layer and a carrier substrate which are arranged in this sequence,
   wherein the bonding layer comprises a plurality of tiled first elastically stretchable structures and a plurality of tiled second elastically stretchable structures, every two of the first elastically stretchable structures are arranged separately, and every two of the second elastically stretchable structures are arranged separately,
   wherein the plurality of first elastically stretchable structures and the plurality of second elastically stretchable structures are arranged interlacedly with each other respectively, the plurality of first elastically stretchable structures and the plurality of second elastically stretchable structures cling to each other, and an orthographic projection of each first elastically stretchable structure on the carrier substrate abuts an orthographic projection of a neighboring second elastically stretchable structure on the carrier substrate.

2. The ultra-thin glass attachment structure of claim 1, wherein the plurality of first elastically stretchable structures and the plurality of second elastically stretchable structures are arranged interlacedly with each other as a checkerboard-like shape.

3. The ultra-thin glass attachment structure of claim 2, wherein each of the elastically stretchable structures comprises an electrostrictive material layer and two electrode layers which are provided on the upside and downside surfaces of the electrostrictive material layer respectively.

4. The ultra-thin glass attachment structure of claim 1, wherein each of the elastically stretchable structures comprises an electrostrictive material layer and two electrode layers which are provided on the upside and downside surfaces of the electrostrictive material layer respectively.

5. The ultra-thin glass attachment structure of claim 4, wherein the electrostrictive material layer is a polyurethane layer having a thickness of 100-200 micrometer.

6. The ultra-thin glass attachment structure of claim 1, wherein each of the elastically stretchable structures comprises an electrostrictive material layer and two electrode layers which are provided on the upside and downside surfaces of the electrostrictive material layer respectively.

7. The ultra-thin glass attachment structure of claim 1, wherein the thickness of the ultra-thin glass layer is 0.05-0.2 mm.

8. The ultra-thin glass attachment structure of claim 1, further comprising glue layers which are attached between the ultra-thin glass layer and the bonding layer and between the carrier substrate and the bonding layer.

9. The ultra-thin glass attachment structure of claim 8, wherein the carrier substrate is a glass substrate with a thickness larger than or equal to 0.5 mm.

10. A method for stripping an ultra-thin glass attachment structure,
    wherein the ultra-thin glass attachment structure comprises an ultra-thin glass layer, a bonding layer and a carrier substrate which are arranged in this sequence,
    wherein the bonding layer comprises a plurality of tiled first elastically stretchable structures and a plurality of tiled second elastically stretchable structures, every two of the first elastically stretchable structures are arranged separately, and every two of the second elastically stretchable structures are arranged separately,
    wherein the plurality of first elastically stretchable structures and the plurality of second elastically stretchable structures are arranged interlacedly with each other respectively, the plurality of first elastically stretchable structures and the plurality of second elastically stretchable structures cling to each other, and an orthographic projection of each first elastically stretchable structure on the carrier substrate abuts an orthographic projection of a neighboring second elastically stretchable structure on the carrier substrate,
    wherein the method comprises steps of:
    driving the first elastically stretchable structures in the bonding layer to expand, which causes the portions of the ultra-thin glass layer at the second elastically stretchable structures to separate from the bonding layer;
    driving the first elastically stretchable structures to contract and the second elastically stretchable structures to expand, which causes the portions of the ultra-thin glass layer at the first elastically stretchable structures to separate from the bonding layer; and
    stripping the ultra-thin glass layer.

11. The method of claim 10, wherein the step of driving the first elastically stretchable structures in the bonding layer to expand, which causes the portions of the ultra-thin glass layer at the second elastically stretchable structures to separate from the bonding layer comprises:

applying an electric field to the first elastically stretchable structures, which causes the first stretchable structures to expand and squeeze the ultra-thin glass layer and then causes the portions of the ultra-thin glass layer at the second elastically stretchable structures to separate from the bonding layer.

12. The method of claim 10, wherein the step of driving the first elastically stretchable structures to contract and the second elastically stretchable structures to expand, which causes the portions of the ultra-thin glass layer at the first elastically stretchable structures to separate from the bonding layer comprises:

removing the electric field at the first elastically stretchable structures, which causes the first elastically stretchable structures to contract;

applying an electric field to the second elastically stretchable structures, which causes the second stretchable structures to expand and squeeze the ultra-thin glass layer and then causes the portions of the ultra-thin glass layer at the first elastically stretchable structures to separate from the bonding layer.

13. An attaching process for manufacturing an ultra-thin glass attachment structure, comprising:

preparing a carrier substrate;

forming a first electrode layer on the carrier substrate;

forming an electrostrictive material layer on a surface of the first electrode layer, wherein the electrostrictive material layer comprises a plurality of tiled first elastically stretchable structures and a plurality of tiled second elastically stretchable structures, every two of the first elastically stretchable structures are arranged separately, and every two of the second elastically stretchable structures are arranged separately, wherein the plurality of first elastically stretchable structures and the plurality of second elastically stretchable structures are arranged interlacedly with each other respectively, the plurality of first elastically stretchable structures and the plurality of second elastically stretchable structures cling to each other, and an orthographic projection of each first elastically stretchable structure on the carrier substrate abuts an orthographic projection of a neighboring second elastically stretchable structure on the carrier substrate;

forming a second electrode layer on a surface of the electrostrictive material layer;

treating a surface of the second electrode layer to facilitate attaching an ultra-thin glass layer;

treating a surface of the ultra-thin glass layer; and attaching the ultra-thin glass layer on the surface of the second electrode layer.

* * * * *